Jan. 10, 1939.  W. M. BASSETT  2,143,235
STAGE SCENERY DOLLY
Filed Feb. 14, 1938
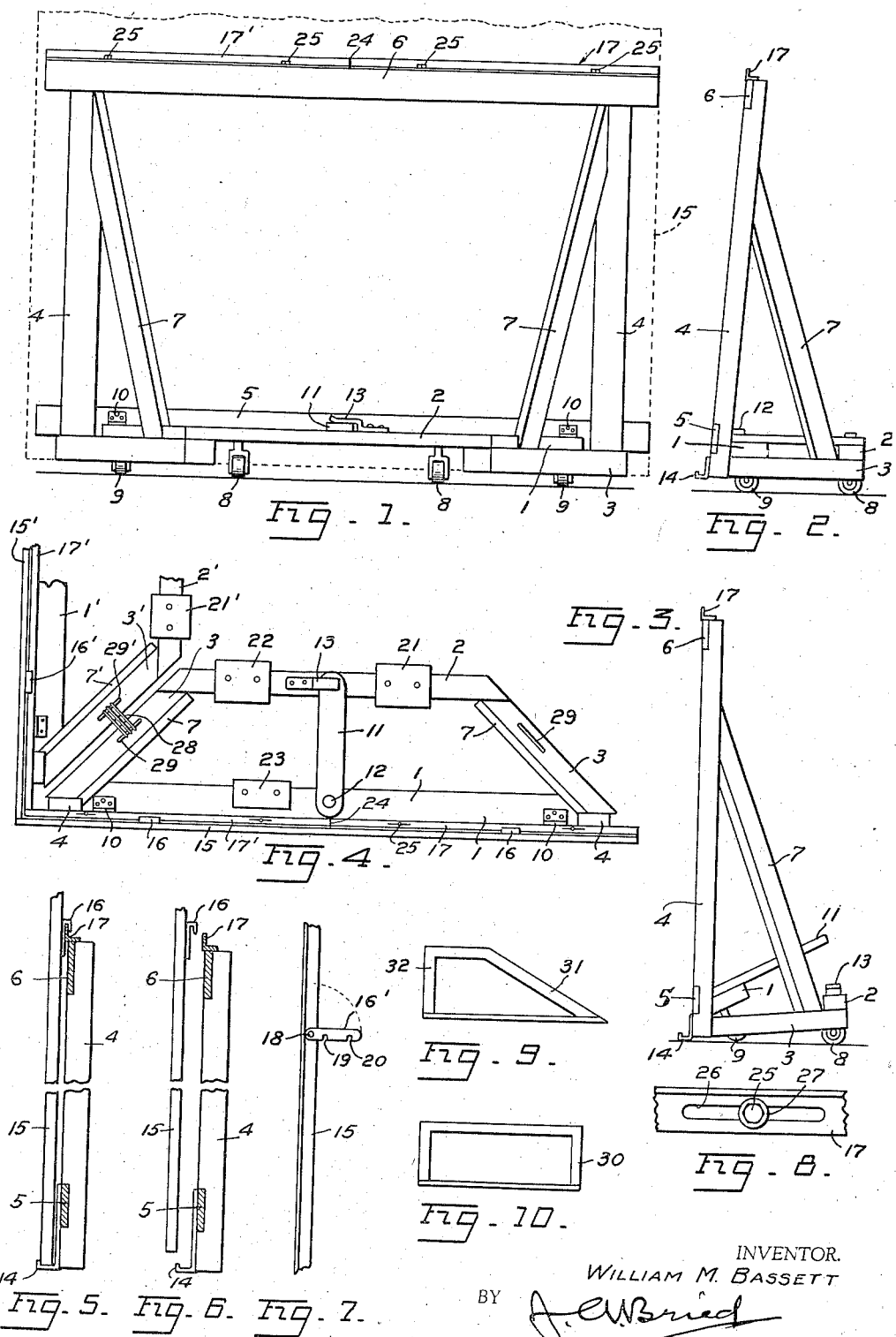
INVENTOR.
WILLIAM M. BASSETT Patented Jan. 10, 1939

2,143,235

UNITED STATES PATENT OFFICE 2,143,235

STAGE SCENERY DOLLY

William M. Bassett, Stanford University, Calif.

Application February 14, 1938, Serial No. 190,449

10 Claims. (Cl. 272—21)

This invention relates to stage scenery and has for its object the provision of means for easy handling and arranging of the so-called scenery "flats" or large flat frames which are covered on one side with canvas upon which the scenery is painted.

A particular object of the invention is the provision of a specially wheeled dolly adapted for supporting a large "flat" in upright position for rolling about on the stage, and arranged to function as an anchor for holding the flat vertical in the desired final position.

A further object is to provide the special dollies of such form that they may be placed close together at right angles or less to join the edges of adjacent "flats" at right angles or less. Another feature is the provision of means to lock the flats to the dollies respectively. Other advantages of the invention will appear in the following description and accompanying drawing.

In the drawing:

Figure 1 is a rear elevation of the special dolly with the lower portion of a "flat" dotted in position.

Figure 2 is an end view of the dolly.

Figure 3 is an end view of the dolly similar to that of Figure 2, but showing the front edge of the dolly lowered to the flor to bring the "flat" vertical and anchor it against movement.

Figure 4 is a plan view of one of my dollies with a portion of a similar dolly arranged at right angles in mitred relation and showing two "flats" joined at right angles along their vertical edges.

Figure 5 is an enlarged vertical end view of the flat showing its engaged relation to the dolly.

Figure 6 is a similar view to that of Figure 5, showing the flat detached from the dolly.

Figure 7 shows a preferred type of hooking member for holding the flat to the upper rail of the dolly.

Figure 8 is an enlarged plan view of a portion of the upper rail of the dolly to show its extendible provisions.

Figure 9 is a reduced size plan view of a modified form of the dolly base frame.

Figure 10 is a reduced size plan view of a further modification in the form of the dolly base frame.

Briefly described, the invention may be said to be a special weighted roller dolly frame provided with means for engaging a large scenery flat from the lower edge and back and supporting it in upright position for rolling about, and provided with means for lowering the front edge of the dolly frame from its rollers to the stage floor to bring the frame to vertical position, and the dolly then being partially off its rollers and weighted, functions as an anchor for rigidly holding the "flat" in position with lower edge substantially on the floor. Also the dolly base frame is mitred off at about 45 degrees to permit two of them to be placed at right angles and bring the two vertical edges of the flats carried by them in contact with the scenes extending at right angles, or less if desired.

The dolly frame may be made of wood or iron, but is indicated in the drawing as made of wood and counter-balanced with heavy weights, as of iron or concrete, to keep it from upsetting when rolling the tall scene frames or flats about, as well as to more securely anchor them in place when the front edge of the dolly is lowered from its rollers to the stage floor.

In the drawing the dolly comprises a lower or horizontal base frame of spaced front and rear members 1, 2, joined by end members 3 which preferably extend at about a forty-five degree angle rearwardly from the front member 1 as shown in Figure 4, so that two such base frames may be placed adjacent one another at right angles as shown in Figure 4, and wherein a portion only of the second base frame is shown and designated with the above numerals primed.

At the forward edge of the base frame is an upright frame composed of two side members 4, lower cross member 5, and upper cross member 6, braced against the base member by two angular braces 7. The base frame is supported on a set of rear rollers or casters 8, and a front pair of casters 9, the latter pair of casters being secured to the horizontally extending board 1 which is hinged at 10 to horizontally extending board 5, so that the horizontal board 1 which carries the rollers may be swung upwardly on these hinges to permit the forward part of the dolly frame to come down against the floor without roller support. To operate the hinged board 1 in this manner it is provided with a lever taking the form of a short board 11 pivotally secured to board 1 as by a through bolt 12 at one end, and normally locked at the other end against board 2 by an overhanging cleat or arm 13 secured to board 2, or in a manner so that the rear end of the lever 11 may be moved laterally from under the engagement with the latching member 13, and then lifted in an arc to the position shown in Figure 3 so as to carry the rollers 9 away from the floor support and permit the forward edge of the dolly frame to rest on the floor as shown in said figure, and with the front side of the frame standing perfectly vertical as shown in said figure.

In order to raise the dolly on its rolling support again it is required that the lever 11 be pushed downwardly again and hooked under the latching member 13 as indicated in Figures 4 and 2 so that the front side of the dolly will be elevated on the rollers 9, and when in this latter position the front side of the dolly frame will not be vertical but will be tipped rearwardly as shown in Figure 2, so that if a scenery flat were supported along the front side of the dolly frame it would lean backward to bring its weight more over the frame and make it less liable to tip forward than if it were vertically supported.

At the lower forward edge of the dolly frame are several sheet metal projecting arms or hooks 14 adapted to receive the lower edge of one of the scenery flats 15 so that the latter may lie against the front part of the frame very much like a picture lies against an easel, and in order to prevent the flat from falling forwardly, it is retained in position by a sheet metal hook member 16 secured to opposite vertical edges of the rear side thereof, and which sheet metal hooks engage over the upper edge of an angle iron or rail 17 secured to the upper transverse member 6 of the dolly frame. The manner of hooking the flat frame to the forward side of the dolly frame as above described is clearly shown in Figure 5, wherein the designated members will be found easily. In Figure 6 the flat frame is shown detached from the front side of the dolly frame to better illustrate the action.

It will be noted from Figure 2 that were the flat frame in position on the dolly frame when the latter is on its rollers, the flat frame would tip backward on top as explained, but that when lowered to the position of Figure 3, the flat frame would be vertical. However, instead of using an upper hook as shown at 16 to hold the flat frame onto the upper rail 17, a hook as shown in Figure 7 may be used. In this figure the flat frame is indicated at 15, as before, but the hook is designated 16' and is shown to be a flat strap of metal pivoted at 18 by a horizontal pin or bolt through the edge of one of the vertical members of the flat frame so that it can swing along the dotted arc indicated in Figure 7 to a vertical position within the thickness of the flat frame, or outwardly to the full line position shown in this figure, and wherein it will be seen to have two notches in its under side designated 19 and 20, and either of which notches may be hooked over the upper edge of the rail 17 so that if it were hooked in the notch 19, it would only be vertical when the front edge of the dolly frame was lowered, but if hooked into notch 20 it would be vertical even if the front edge of the dolly frame were not lowered, of if similar roller raising means as applied to rollers 9 were applied to both sets of rollers and the dolly frame permitted to bodily descend to the stage floor.

Since the scenery frames are very large and high and inclined to be quite top heavy, and it is desirable that the dolly frame remain as narrow as possible, recourse is had to heavy weights 21, 22 and 23, which are conveniently positioned and secured about the dolly base frame to hold the same down firmly against any tipping over by the scene frame or flat in rolling the dolly and flat about, or when finally positioned in the desired place by lowering the front or the entire dolly frame to the stage floor as explained.

It is desirable that the horizontal members 5 and 6 of the upright portion of the dolly frame be almost as long as the width of the scenery flat, or about an inch or two shorter, and since these flats are generally made to standard sizes, the dolly frames may so be made accordingly. However, it is sometimes desirable to have the upper and lower horizontal members 5 and 6 extendible to meet different widths of scenery frames, or merely the upper rail 17 so that it will give an adequate support against the back of the two vertical side members of the scenery frame or flat; thus, as indicated in Figure 1, the rail 17 is shown divided in the center at 24 to form two sections 17 and 17', each of which may be bolted to the upper horizontal member 6 of the upright frame as by bolts 25 passing through slots 26 in the rail 17 as indicated in Figure 8 of the drawing, and wherein a washer 27 is shown positioned beneath the bolt head. This provides for releasing the bolts and pulling out the rail sections to any desired length so that the hooks 16 or 16' on the scenery flat or frame will engage over them properly.

The dolly frame is mitred rearwardly as explained so that it may be placed at a right angle to an adjacent frame as shown in Figure 4, to form a right angle with the scenery flats carried by the two frames as indicated in said figure, and wherein the scenery flats are respectively designated 15 and 15'. When the two dolly frames are in this position and lowered to the stage floor as described, they will be relatively rigid and generally sufficiently so to hold the scenery in place for the show. However, if desired, the two dolly frames may be lashed together as by a rope 28 wrapped around a couple of rope cleats 29, secured to the adjacent members 3 and 3' of the dolly frames, as indicated in Figure 4.

It is, of course, manifest that where it is not desired to join any of these scene frames at right angles as indicated in Figure 4, the base frame of the dolly may be rectangular as shown in Figure 10, at 30, or in some cases it may have but one end mitred as at 31, in Figure 9, and with the other end left at right angles as shown at 32 in this figure, thus forming in the latter case a base frame with one right-angled end and one mitred end so that when two are placed with right angle ends together they will form a frame of the general shape shown in Figure 4 with the mitres at the extreme ends of the assemblage.

It is also evident that instead of having the ends of the frame mitred at 45 degrees as shown in the preferred form, Figure 4, the mitre may be at any other angle desired, though for regular stage use the form shown in Figure 4 appears to meet every requirement insofar as I have been able to find in practical use of these devices in stage scenery flat shifting and assembling.

While I prefer the type of hooks shown in Figure 7 to hold the upper part of the flats to the rail 17 as they fold within the thickness of the frame when not in use, and permit the scenery flats to be stacked flat upon one another for shipment without protruding parts, the hooks 16 shown in Figures 5 and 6 are also very good, and in some cases where scenery may not be provided with either style of hook, in an emergency the scenery flat may be lightly nailed to the upper transverse member 6, as with light finishing nails which may be removed readily.

The lower arms or brackets 14 which support the lower edge of the flats may be as thin as one-eighth inch steel plate of several inches in width, and hence when the forward edge of dolly frame is dropped to the floor, the lower edge of the scenery flat also is substantially tight against the floor.

In considering the invention as above described, it will be seen that it provides for quickly rolling the various scene flats to position and locking them securely in place, and for as quickly removing them and rolling them out of the way, and if desired leaving them each attached to one of the dollies until shipment to some other town. Thus the scenery may be changed for different shows in one evening, or for different evenings successively without ever removing the scenery flats from their respective dollies until the engagement is over. This invention, therefore, permits one man to roll the scenes about no matter how large and clumsy they are, and to accomplish more work in a given space of time than several men could possibly do by the old method which required bodily carrying the scenes to the required position, moving them from place to place until they were just right, and then tacking them lightly to the floor with nails and supporting them by angular braces from behind also generally nailed to the flat and to the flooring, and all of which nails had to be pulled out and braces removed at the end of every act in order to shift the scenes.

It is evident in considering the above invention that various modifications may be made to the structure without departing from the spirit of the invention as sought to be embraced within the scope of the appended claims, and that the dolly frames may be of all sizes and constructed of any desired materials. Also the rollers may be of any size and may be rubber-tired or of felt or solid rubber if desired, to eliminate noise in rolling the scenes about, and also that the precise mechanism for raising or lowering the rollers is optional, though the construction shown is preferred on account of its simplicity and low cost.

Having thus described my invention and the manner of its use, together with some if its variations, what I claim is:

1. A device for handling stage scenery flats comprising a dolly provided with an upright frame and a base, rollers under said base, means for holding the flat adjacent said upright frame with the flat vertical, the base of said dolly when viewed in plan being mitred off at one end to join a similar dolly arranged at an angle thereto.

2. A device for handling stage scenery flats comprising a dolly provided with an upright frame and a base, rollers under said base, means for holding the flat adjacent said upright frame with the flat vertical, the base of said dolly when viewed in plan being mitred off at both ends to join a similar dolly arranged at an angle thereto.

3. A device for handling stage scenery flats comprising a dolly provided with an upright frame and a base, rollers under said base, means for holding the flat adjacent said upright frame with the flat vertical, the base of said dolly when viewed in plan being mitred off at both ends to join a similar dolly arranged at an angle thereto, and provided with means for securing adjacent dollies together.

4. A dolly for handling stage scenery-flats comprising a horizontal base provided with an upright frame at one edge, a plurality of spaced floor casters on said base supporting the dolly for rolling about, means arranged and adapted for detachably holding a stage scenery-flat upright on said dolly adjacent said upright frame and with the lower edge of the flat adjacent but clear of the floor, and means weighting the rear of said dolly against toppling with a fall flat.

5. A device for handling stage scenery flats comprising a dolly provided with an upright frame and a base, a plurality of spaced floor rollers under said base supporting the dolly against tipping, means for holding the flat on the dolly adjacent the front side of said upright frame with the flat tipped backward from the vertical, and means for tipping the flat to bring the same to vertical position for use in stage settings.

6. A device for handling stage scenery flats comprising a dolly provided with an upright frame and a base, a plurality of spaced floor rollers under said base, means for holding the scenery flat on said dolly adjacent the front side of said upright frame with the flat tipped backward from the vertical, and means for tipping the dolly to bring the secenery flat to vertical position and block the dolly against rolling action.

7. A device for handling stage scenery flats comprising a dolly provided with an upright frame and a base, a plurality of spaced floor rollers under said base, means for holding the scenery flat on said dolly adjacent the front side of said upright frame with the flat tipped backward from the vertical, and means for tipping the dolly to bring the scenery flat to vertical position and block the dolly against rolling action, the base of said dolly provided with weights to prevent the same from toppling with a tall flat.

8. A dolly for handling stage scenery flats in upright position comprising a base frame with an upright rearwardly slanted frame at one edge, means for supporting a flat against the front of the upright frame, a plurality of spaced floor rollers on the base frame supporting the dolly against tipping, and means for lowering the front of the frame from the rollers to the floor to rest thereagainst and in which latter position the upright frame is brought to vertical position, said means comprising a horizontally extending member to which the rollers at the front of the frame only are mounted, means hingedly connecting said member to a rigid portion of the dolly, and a lever for manually swinging said member on its hinges for raising and lowering the frame, and means for locking the lever with the frame in raised position.

9. In a structure as set out in claim 4, supporting arms at the upper end of said upright frame arranged and adapted for lateral extension beyond opposite sides of the frame behind the flat when in position, for adjustment to support various widths of flats.

10. A dolly for handling stage scenery flats in upright position comprising a base frame with an upright rearwardly slanted frame at the front edge of the base frame, means for supporting a scenery flat against the front of the upright frame, floor rollers on the base frame supporting it for rolling about, and means for lowering the front only of the frame from the rollers to the floor to rest thereagainst and in which latter position the upright frame is brought to vertical position with the scenery flat in position for use in stage settings.

WILLIAM M. BASSETT.